Patented Oct. 8, 1940

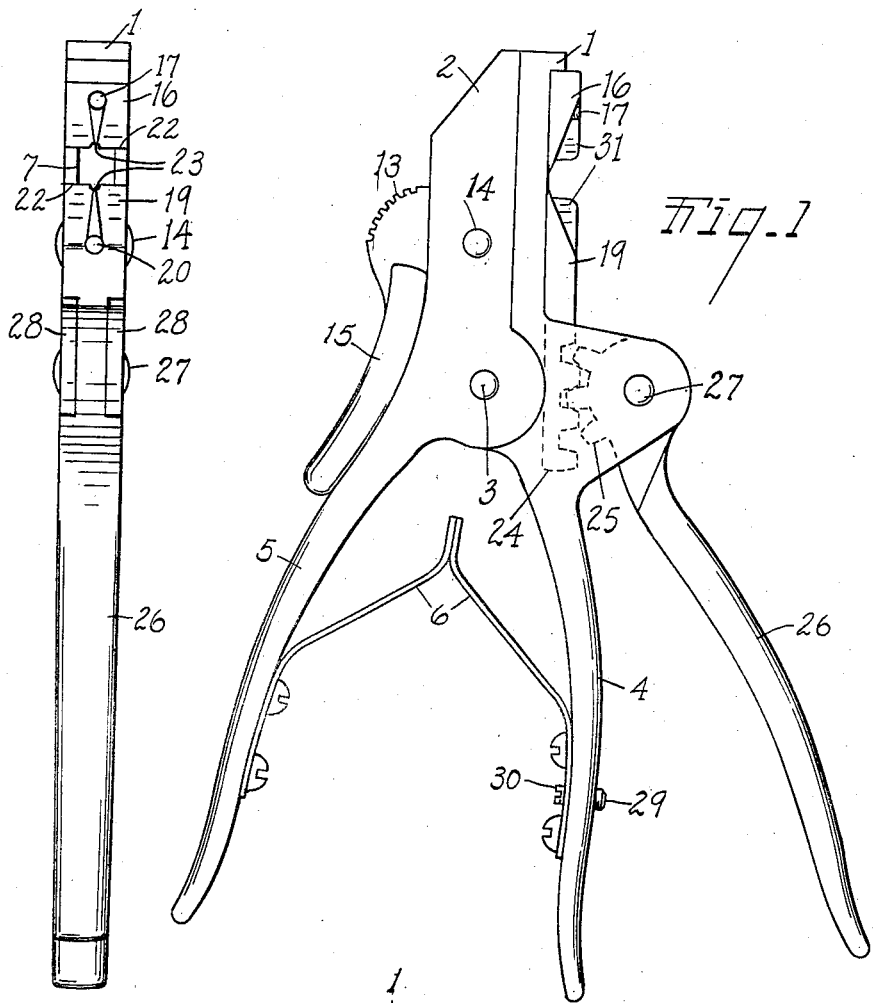

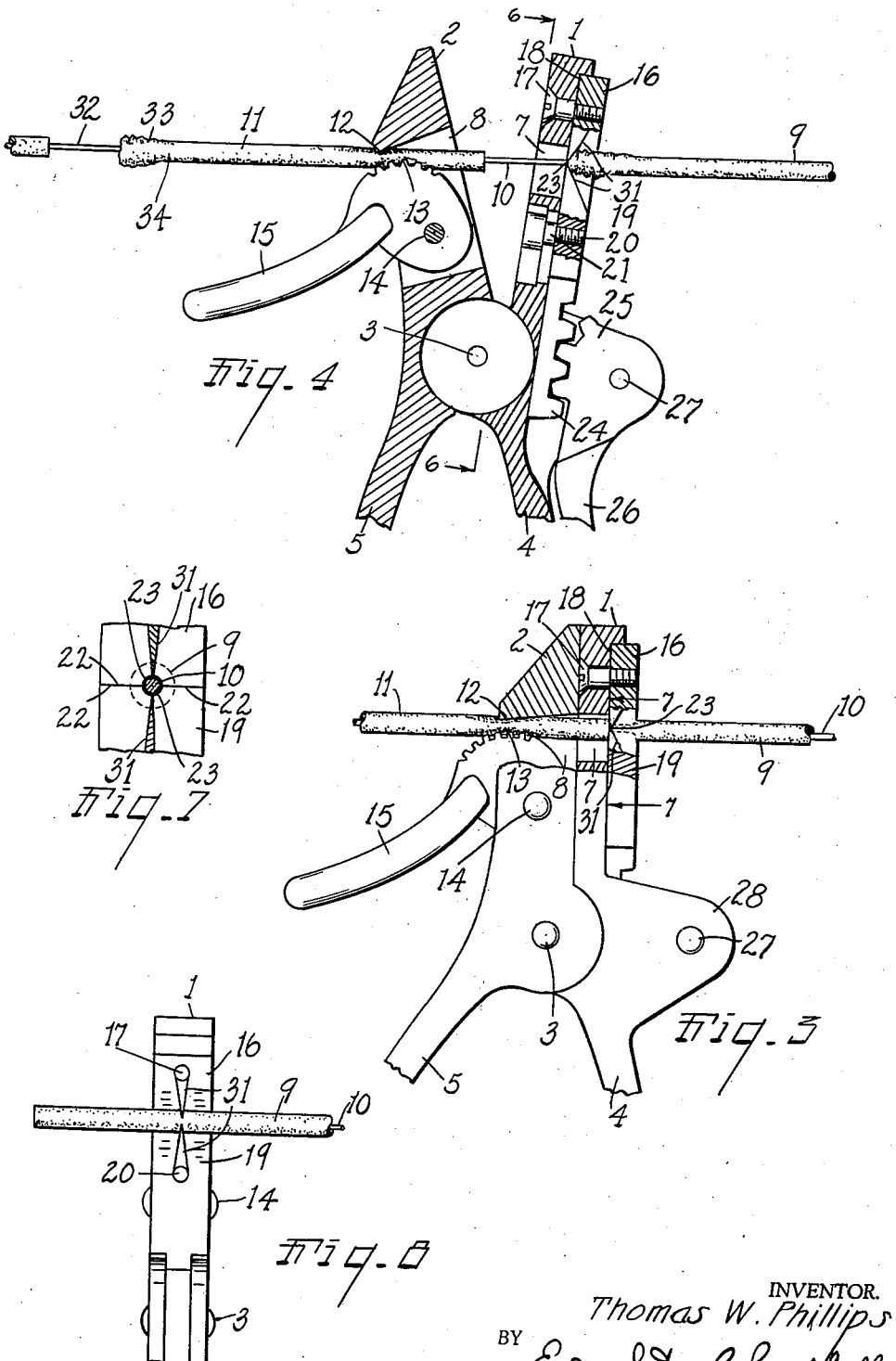

2,217,077

UNITED STATES PATENT OFFICE 2,217,077

WIRE INSULATION CUTTING AND STRIPPING DEVICE

Thomas W. Phillips, Saginaw, Mich.

Application February 17, 1939, Serial No. 256,961

7 Claims. (Cl. 81—9.5)

The main objects of this invention are:

First, to provide a tool for cutting and stripping the insulation from wires, cables, and the like which is very easily manipulated and highly efficient.

Second, to provide a tool of this type or class which is simple and durable in construction and requires a minimum of effort on the part of the operator.

Third, to provide a tool of the character described which quickly and cleanly removes the insulation from the wire either at a point intermediate its ends or at an end.

Objects relating to details and economies of the invention will appear from the description to follow. The invention is defined and pointed out in the claims.

Preferred embodiments of the invention are illustrated in the accompanying drawings, in which:

Fig. 1 is a side view of a structure embodying my invention.

Fig. 2 is a face or front edge view looking from the right of Fig. 1.

Fig. 3 is a fragmentary view partially in central longitudinal section illustrating the manner of using the tool, a piece of insulated wire being shown in position in the tool and with the clamping jaws engaged therewith and the stripper members actuated preliminary to the stripping action.

Fig. 4 is a fragmentary view mainly in longitudinal section illustrating the stripping step.

Fig. 5 is a perspective view of the movable stripper member.

Fig. 6 is a fragmentary view in section on line 6—6 of Fig. 4, further illustrating details of the stripper head and the mounting of the stripper members thereon.

Fig. 7 is a fragmentary view on section line 7—7 of Fig. 3.

Fig. 8 is a fragmentary view corresponding to that of Fig. 2 with the stripper members in closed position and with a piece of insulated wire in insulation cutting position therein.

The embodiment of my invention illustrated comprises a stripper head 1 and a clamping head 2, these heads being pivotally connected at 3 and provided with handles 4 and 5 respectively. It will be noted that the pivots of the handles are so associated with the heads, i. e., the handles being in non-crossing relation, that the heads are separated as indicated in Fig. 4 by a movement of the handles toward each other. The coacting blade springs 6 serve to close the heads or move them toward each other by a separating movement of the handles. These heads have aligned holes 7 and 8 therein adapted to receive the wire 9, the wire being shown at 10 and the insulation at 11.

The head member 2 is provided with a fixed gripping jaw 12 and with a toothed gripping jaw 13 which is eccentrically pivoted at 14 and provided with a handle 15 for manual manipulation, the handle being sprung outwardly to actuate the pivoted jaw to clamping position. The eccentric mounting not only serves to swing the teeth of the pivoted jaw member into clutching engagement with the work but it will be observed that the pulling stress exerted on the movable jaw tends to urge it into actuated or work clamping position.

The stripper head 1 is provided with a combined stripper and cutter member 16 which is detachably secured by means of the screw 17 which clamps the member 16 onto a seat 18 provided therefor on the outer side of the member 1. The coacting movable stripper member 19 is slidably mounted upon the member 1 by means of the shouldered screw 20 which engages the stepped slot 21. These members 16 and 19 are provided with opposed cutting edges 22 having central opposed wire receiving notches 23 therein, the wire 10 being within these notches when the members are closed as is clearly shown in Fig. 7.

The movable member 19 is provided with a rack 24 which is engaged by the segment 25 on the handle 26 which is pivoted at 27 between projecting ears 28 provided therefor on the head member 1. The movable stripper member is actuated to closed position by the movement of the lever or handle 26 inwardly or toward the handle member 4 which is provided with an adjustable stop 29 engageable with handle 26 and having a head 30 which may be manipulated by means of a screw driver or other suitable tool. This stop limits the closing movement of the strippers and is intended for use in the event the tool is used on a larger diameter of wire than will be received in the recesses 23 when the stripper members are completely closed as shown in Fig. 7.

It is sometimes desirable to cut the insulation on a wire without completely introducing it into the tool—that is, inserting it through the openings 7 and 8 and I therefore provide the stripper members with auxiliary cutters 31 which are disposed in an angular relation to the cutting edges 22 and may be presented to an insulated wire 9 as shown in Fig. 8 for the cutting of the insulation thereon.

The tool may be used either for stripping an end of an insulated wire or for stripping a central portion thereof. I have illustrated particularly the stripping of a central portion, and the stripping of an end portion will be obvious from the operation for stripping the central portion.

I show at 32 a stripped portion of an insulated wire and it will be noted that the insulation covering the stripped portion designated 33 is left on the wire but it can be easily removed if desired although that commonly is not necessary. If it is desired to remove it, the stripper jaws are properly positioned and actuated to form a cut at 34 and the loosened portion 33 pulled off or removed.

In Fig. 3, I illustrate the clamping jaws closed upon the wire and the strippers actuated to cut the insulation. This is done by swinging the lever or handle 26 inwardly until it occupies a substantially superimposed relation to the handle 4. In that position, the lever or handle 26 and the handles 4 and 5 may be simultaneously grasped and by closing the hand or moving the handles toward each other the jaw members are separated as shown in Fig. 4 with the strippers in closed position thereby stripping the insulation as is illustrated in Fig. 4. As stated, if it is desired to remove the stripped portion of the insulation, spaced cuts may be made in the insulation before the stripping operation.

The cutters 31 serve to split the end of the insulation not only rendering it more easily removed in the event it is desired to entirely remove it but also serving to render the stripping operation more easy as there is a tendency for the split to be extended as the stripping operations proceeds. I have not attempted to illustrate this in the accompanying drawings.

If it is desired to cut off a stripped portion of the wire, that may be done by positioning the stripped wire between the cutting edges of the stripper members and closing the members—that is, swinging it to one side to bring it out of register with the recesses in the cutting edges. The positioning of the stripper actuating handle or lever 26 so that it is simultaneously grasped with the handles 4 and 5 insures that the strippers be retained in stripping engagement with the wire and avoids the necessity of providing other means for holding the strippers in closed position.

Although the tool is shown with alined holes 7, 8 for receiving the wire preparatory to operating on the same, it will be apparent that if desired side openings may be made in the heads adjacent clamping elements 12, 13 on the one and the cutters on the other to permit sidewise insertion of the wire relative thereto.

My improved tool is highly efficient and can be very easily manipulated.

I have illustrated and described my improvements in an embodiment which I have found to be highly efficient. I have not attempted to illustrate or describe certain embodiments and adaptations of my invention which I contemplate, as it is believed that this disclosure will enable those skilled in the art to embody or adapt my improvements as may be desired.

Having thus described my invention what I claim as new and desire to secure by Letters Patent, is:

1. In a tool of the class described, the combination of a clamping head and a stripper head having wire receiving openings therein, said heads being pivotally connected and provided with handles arranged so that the heads are separated on the movement of the handles toward each other, spring means acting to close said heads, a fixed clamping jaw on said clamping head, a manually actuated toothed clamping jaw eccentrically pivoted on said clamping head to coact with said fixed jaw for clamping a wire thereto arranged through said opening in said clamping head, a relatively fixed stripper member on said stripper head, a coacting stripper member slidably mounted on said stripper head and provided with a rack, said stripper members having opposed cutting edges with wire receiving notches therein, and a stripper member actuating handle pivotally mounted on said stripper head and provided with a segment coacting with the rack of said slidably mounted stripper member, said stripper member handle being arranged so that when in actuated position it may be gripped with the handle of the stripper head to hold the stripper member in stripping position while the stripper head and clamping head handles are actuated to impart stripping movement to the heads.

2. In a tool of the class described, the combination of a clamping head and a stripper head provided with handles pivoted to one another in non-crossing relation so that the heads are separated on the movement of the handles toward each other, wire clamping means on said clamping head, a relatively fixed stripper member on said stripper head, a coacting stripper member slidably mounted on said stripper head and provided with a rack, said stripper members having opposed cutting edges with wire receiving notches therein, and a stripper member actuating handle pivotally mounted on said stripper head and provided with a segment coacting with the rack of said slidably mounted stripper member, said stripper member actuating handle being arranged so that when in actuated position it extends adjacent the handle of the stripper and may be gripped with the handle of the stripper head to hold the stripper members in stripping position while the stripper head and clamping head handles are actuated to impart stripping movement to the heads.

3. In a tool of the class described, the combination of a clamping head and a stripper head provided with handles and operatively associated so that the heads are separated on the actuation of the handles, manually actuated wire clamping means on said clamping head, coacting stripper members mounted for relative sliding movement on said stripper head having opposed cutting edges and wire receiving notches in their cutting edges, a lever pivoted on the tool for closing said stripper members, said lever extending adjacent said stripper head handle so that when in stripper closing position the lever may be grasped simultaneously with the said head handles for retaining the stripper members in closed position while stripping movement is imparted to the heads, and means for operatively connecting said lever with at least one of said stripper members including means for converting pivotal movement characterizing the lever to a sliding movement of said stripper member on said stripper head.

4. In a tool of the class described, the combination of a clamping head and a stripper head provided with handles and operatively pivoted in non-crossing relation so that the heads are separated on the actuation of the handles, manually actuated wire clamping means on said clamping head, coacting stripper members mounted on said stripper head for relative sliding movement and having opposed cutting edges and wire receiving notches in their cutting edges, and manually actuated means for closing said stripper members, comprising a lever pivoted on the tool and means connecting said lever and at least one of said stripping members for sliding the latter on said stripper head.

5. A wire stripping device comprising a pair of pivotally connected heads adapted to be separated upon actuation, one of said heads having relatively a clamping jaw fixed thereon and a clamping jaw mounted thereon for movement into clamping relation to the fixed jaw to thereby clamp an insulated wire, the other of the heads having fixed and movable cutting and stripping members thereon adapted to cut through the insulation of the wire, relative movement of said heads resulting in stripping of the insulation, and means including an element pivotally mounted on said other of said heads and operatively connected to said movable cutting and stripping member and manually actuable for effecting relative movement of the fixed and movable cutting and stripping members independently of said clamping jaws.

6. A tool of the class described comprising a pair of pivotally connected heads provided with handles, one of said heads being provided with wire clamping means and the other with relatively movable insulation cutting and stripping members, and means for closing said cutting and stripping members independently of the actuation of said heads and wire clamping means, said last named means including a separate cutting and stripping handle disposed adjacent one of said head handles and means operatively connecting said cutting and stripping handle with said cutting and stripping members.

7. A tool of the class described comprising a pair of pivotally connected heads provided with means for manually actuating the same for separating movement, a clamping means on one of said heads and a combined insulation cutting and stripping means on the other of said heads movable relative thereto, said clamping means and cutting and stripping means being provided with means for independent manual actuation to initially engage a wire to be operated on, said cutting and stripping means comprising a pair of members having opposed cutting edges with centrally disposed opposed notches in their cutting edges, the means for actuating said stripper and cutter members including means pivoted on said head actuating means and disposed adjacent the same so that the strippers and cutting members may be held in actuated position while the operator simultaneously grasps the head actuating means, and means connecting said last named pivoted means with said cutting and stripping means.

THOMAS W. PHILLIPS.